United States Patent Office

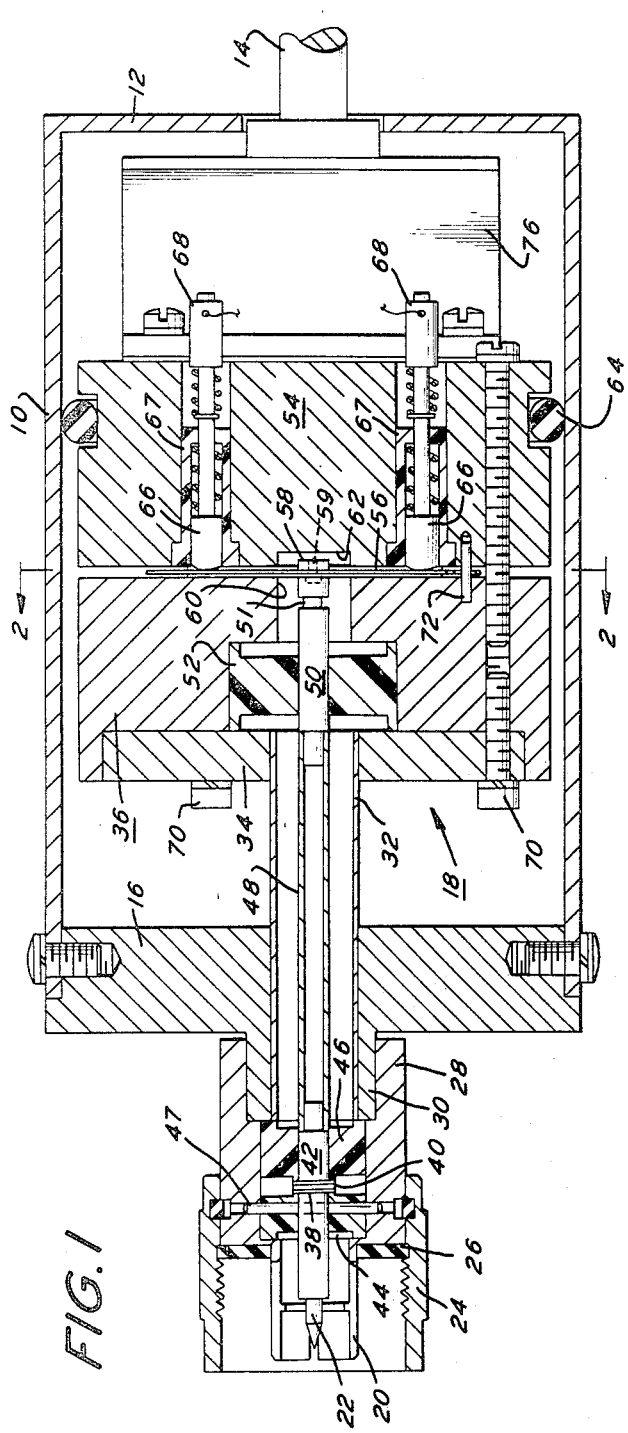
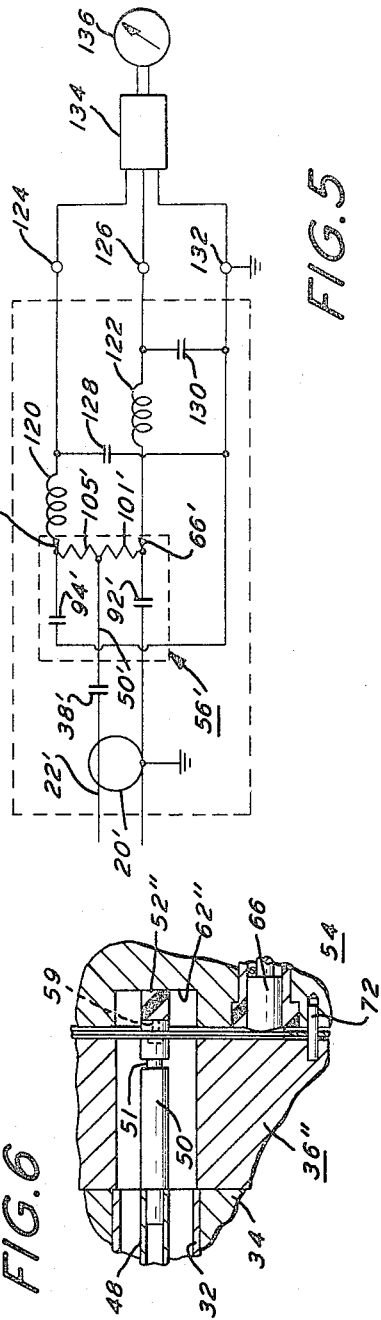

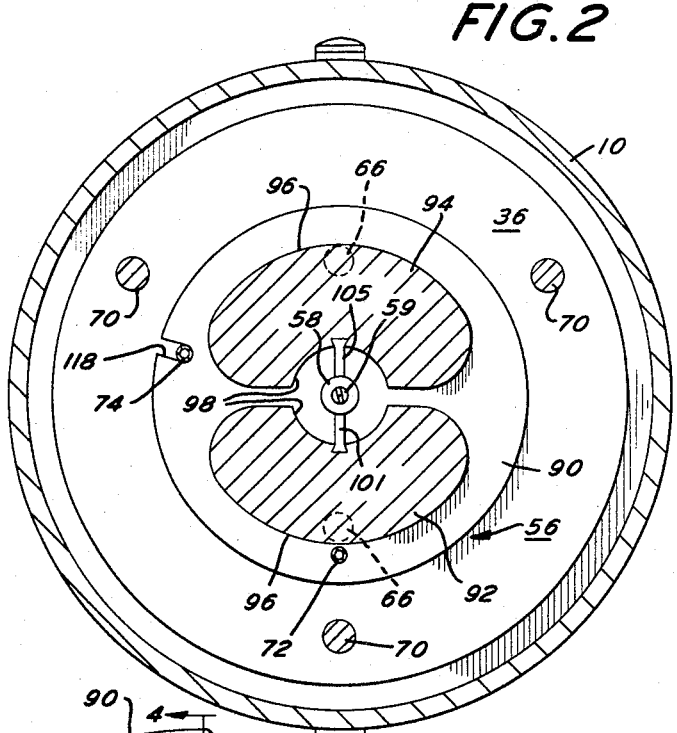
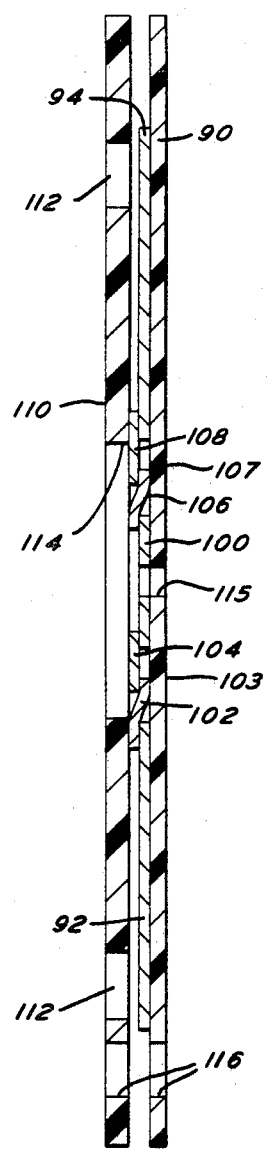
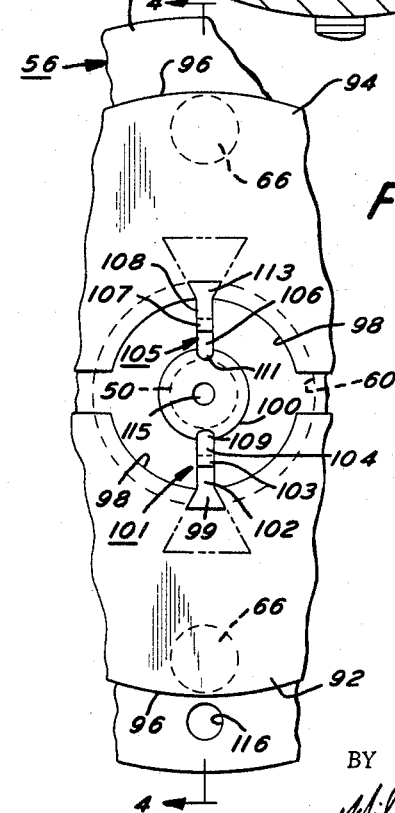
INVENTOR.
SHERMAN A. RINKEL

3,384,819
Patented May 21, 1968

3,384,819
MICROWAVE POWER CALORIMETER USING A THIN-FILM THERMOPILE LOAD
Sherman A. Rinkel, Bethpage, N.Y., assignor to General Microwave Corporation, a corporation of New York
Filed Mar. 19, 1965, Ser. No. 441,155
20 Claims. (Cl. 324—95)

ABSTRACT OF THE DISCLOSURE

A microwave power calorimeter using a thin-film thermopile load includes a boron nitrile bead between the inner and outer conductors of a coaxial mount for maintaining the inner cold junction portions of the thermopile at the same temperature as the outer cold junction, so that substantially the same temperature difference is developed between each hot junction and the associated cold junction portion. The cold junction portions of the thermopile are mounted to be located inside the space between the inner and outer conductors, whereby the current paths for microwave and low frequency currents are substantially the same, and the power of the low frequency currents may be used to calibrate measurements of microwave power.

---

This invention relates to thermoelectric devices for measuring electromagnetic wave energy, and particularly to a thermopile device for measuring microwave power.

In the measurement of microwave power in a coaxial transmission line or a hollow waveguide, a thermopile element connected as the load may be arranged to function as a well matched termination to absorb the incident radio frequency power. Some of the junctions of such a thermopile are thermally connected to the electrical conductors of the transmission line or wave guide (and act as cold junctions), while the other (hot) junctions are located in the space between the conductors within the electromagnetic field. The thermopile absorbs the radio frequency (R-F) power of the field and raises the temperature of the hot junctions relative to the cold junctions so that a thermoelectric voltage is generated proportional to the temperature rise. By keeping the temperature differential between the junctions small, the unit functions as a true square-law (RMS) device producing a direct output voltage directly proportional to the absorbed power.

Since such a device depends upon thermal characteristics for its action, and the measured temperature changes may be extremely small with generated voltages in the microvolt range, it is most important that ambient temperature effects on the instrument be avoided and that the signal-to-noise ratio be high. In addition, the thermal characteristics should have a high stability and minimal drift. Another problem involved in the construction of a microwave power measuring device arises from the customary calibration of such a device with audio frequency currents for which suitable standards are available. Thus, it is necessary in connection with such calibration that the operation of the thermoelectric device be substantially the same for microwave and audio frequencies. Moreover, it is desirable that the device be suitable for measuring a broad band of microwave frequencies.

It is among the objects of this invention to provide a new and improved power measuring device using thermoelectric elements.

Another object is to provide a new and improved thermopile device for measuring microwave power which is effectively independent of ambient temperature.

Another object is to provide a new and improved thermopile device for measuring microwave power which operates substantially uniformly over the period in which measurements are made.

Another object is to provide a new and improved thermopile device for measuring microwave power which has a high signal-to-noise ratio.

Another object is to provide a new and improved thermopile device for measuring microwave power over low as well as high frequencies to achieve broad band operation.

Another object is to provide a new and improved thermopile device for measuring microwave power in which the operation at audio frequencies is substantially the same as that at microwave frequencies.

In accordance with an embodiment of this invention, a microwave power measuring thermopile for a coaxial transmission line includes a single pair of thermocouples, the hot junctions of which are positioned in the space between the inner and outer conductors, and cold junction portions of each are thermally connected to the inner and outer conductors. The cold junction at the outer conductor is capacitively coupled thereto for R-F, while the cold junction at the central conductor is directly connected to that conductor, and a large capacitance in series with the central conductor is provided by the insertion in that conductor of a dielectric disc at an appropriate point thereof. A large isothermal mass is provided for absorbing the thermal energy so that the central conductor and outer conductor remain susbtantially isothermal through the period of measurement, and the cold junctions connected thereto correspondingly remain isothermal. This large isothermal mass is thermally connected to both the central conductor and the outer conductor of the coaxial line; by the use of a dielectric of good thermal conductivity between those conductors, the thermal connection is achieved without affecting adversely the R-F characteristics of the coaxial line structure.

A feature of this invention is the formation and positioning of the thermopile cold junctions in such a manner that they are within the electromagnetic field space and in good thermal contact with the central and outer conductors. Thereby, it is found that the operating conditions for radio frequency and calibrating audio frequency currents are substantially the same, while any thermal heating of the cold junctions is effectively negligible.

The foregoing and other objects of this invention, the features thereof as well as the invention itself, may be more fully understood from the following description when read together with the accompanying drawings, in which:

FIG. 1 is a longitudinal sectional view of a power measuring device for a coaxial transmission line in accordance with this invention;

FIG. 2 is an enlarged sectional view along the line 2—2 of FIG. 1;

FIG. 3 is an enlarged fragmentary view of the face of the thermopile unit used in the device of FIG. 1;

FIG. 4 is an enlarged sectional view along the line 4—4 of FIG. 3;

FIG. 5 is a schematic circuit diagram of the power measuring unit of FIG. 1 in which the thermopile unit is represented by an equivalent circuit diagram; and FIG. 6 is a fragmentary longitudinal sectional view similar to FIG. 1 of a modified form of the invention.

In the drawing, corresponding parts are referenced by similar numerals throughout.

The power measuring unit of FIGS. 1 and 2 includes a cylindrical metallic casing 10 which is closed at one end 12 except for a central opening therein that passes an output cable 14 with an insulated cover. The other end of the casing 10 is closed by a cylindrical plate 16 of substantial thickness that is bolted to the casing 10.

Within and spaced from the casing 10 is mounted the structure 18 that functions as the measuring unit.

The electrical input connection is a conventional coaxial coupler formed as an outer tube 20 and central coaxial rod 22. A surrounding coupling nut 24 and annular gasket 26 is used to connect the male coaxial coupler 20, 22 to a counterpart female coupler in a conventional fashion. The outer conductor 20 is connected at its inner end to a cylindrical metallic tube 28 of larger diameter having an offset portion at one end to mate with the outer conductor 20. At the other end the tube 28 receives internally an annular flange 30 projecting from the center of annular plate 16. The latter is fastened internally to one end of a thin-walled stainless steel tube 32 which carries at its other end another annular plate 34 that is attached to one face of a large, thick annular plate 36. All of the elements 20, 28, 16, 32, 34, and 36 are metallic and in good electrical contact whereby an outer coaxial conductor is established continuously with an internal diameter that varies depending on the dielectric constant of the material that it encloses.

The central conductor 22 of the coaxial coupler is a metallic rod that terminates in a flanged portion 38 that is bonded to a disc of dielectric material, such as barium titanate, having its opposite surfaces tinned to make good electrical contact with the flanged portion 38 and a corresponding flanged portion of a metallic rod 42 on the other side of the disc 40; thereby, a series capacitor is formed in the central conductor. Good electrical contact is maintained at disc 40 by means of two dielectric beads 44, 46 (such as Teflon) of annular shape that surround the rods 22 and 42 and engage the flanges thereto to ensure a good mechanical support therefor when assembled and designed for a good impedance match. A pin 47 of non-conductive material passes through the tube 28, bead 44, and rod 22 to prevent rotation and axial movement of the parts during coupling and uncoupling of the coaxial coupler.

The other end of the rod 42 is reduced in diameter and fits tightly into a stainless steel hollow tube 48 which passes coaxially through the tube 32. The other end of the tube 48 is similarly connected to a rod 50 of the same diameter which terminates in a flat surface in the same plane as the inner face of the annular plate 36 and which has a portion 51 of reduced diameter near its outer end. The portion 51 functions to develop an equivalent series inductance that is effective to compensate for circuit reactances (e.g., in the terminating impedance of a pair of thermocouples and in the mount itself) so as to provide a broad band impedance match to the coaxial line impedance. The solid rod 50 is made of a good thermal conductor such as brass or copper, and surrounding and supporting it is an annular bead 52 of dielectric material that makes very tight thermal contact with the rod 50 and the surrounding plate 36. Thus, a coaxial central conductor is formed by rod 22, series capacitor 38, rod 42, tube 48, and rod 50.

The plate 36 functions as a heat sink, and it is bolted to the face of a similar metallic plate 54 with a thin thermopile unit 56 pressed between the inner faces thereof. The thermopile unit 56 is attached to the outer end of central conductor 50 by means of a screw fastener 58 and washer 59. The central opening 60 of heat sink 36 provides a coaxial surface of diameter appropriate for the desired coaxial line characteristics; it is generally of the same diameter as that of tube 32 except for the enlarged opening around bead 52. The inner surface of heat sink 54 is formed with a central coaxial cavity 62 whose diameter is suitable to provide a waveguide beyond cutoff (e.g., it may be the same as the diameter of the aligned inner surface 60 of heat sink 36), and it is of a depth suitable for proper impedance match.

An O-ring 64 of thermally and electrically non-conductive material surrounds the heat sink 54, fitting in a peripheral groove thereof, and supports the unit 18 in a central position within the enclosure 10. Two electrical contacts 66 pass through openings in the heat sink 54 to engage the thermopile elements at suitable points thereof. Each contact 66 includes a rod that has an enlarged head that makes the contact and that is spring-biased against the thermopile element as it slides through an insulator bushing 67 fitted within the hole in the heat sink 54. At the outer end of the contact rod 66, a cylindrical metallic sleeve 68 is slidable thereover and spring-biased to an outer position. A hole in the sleeve 68 mates with a similar hole in the rod 66 when the sleeve 68 is pressed inwardly; with this arrangement, a wire may be slid into the mating holes, the sleeve 68 released and biased outwardly to crimp the wire in good electrical contact so that soldering is not required. Thereby, and by use of the same material (e.g., copper) throughout, the thermoelectric effects that are customary in solder joints are avoided. Three bolts 70 pass through both heat sinks 36 and 54 to hold them assembled in mating relation. Two index pins 72 and 74 (FIG. 2) which are arranged in a non-diametric relationship ensure proper alignment of the heat sinks 36 and 54 in a unique assembly relationship. A bracket 76 attached between the outer surface of heat sink 54 and spaced from the rear wall 12 of the casing 10 is used to mount a number of electrical components described below in connection with schematic diagram FIG. 5, and output cable 14 carries a number of output conductors associated with this circuitry.

The construction of the device of FIG. 1 serves to isolate the measuring unit 18 from all external thermal influences. This is accomplished by the use of the stainless steel tube 48 for the central coaxial conductor which thermally decouples the input conductor 22 from the inner conductor 50 at which the measuring operations take place. Due to the poor thermal conductivity of the stainless steel and the thin wall of the hollow tube 48, the central conductor 50 is effectively thermally isolated. The outer metallic casing 10 provides good thermal isolation in that it is a large isothermal mass and is spaced from the measuring unit 18 by air (or other suitable thermal insulating material). The spacing between the casing disc 16 and the heat sink elements 34 and 36 is a large one, and the thermal conduction is only by way of the thin-wall stainless steel tube 32 which effectively decouples the heat sink 36 thermally from the casing.

Details of the thermopile unit 56 shown in FIG. 2 are illustrated in the enlarged view of FIG. 3, which enlargement is extremely exaggerated to illustrate small details. The base of the unit is a film substrate 90 of generally circular configuration and made of an electric dielectric material. The substrate 90 is made extremely thin (e.g., 0.002 inch) so that it is effectively thermally conducting through its thickness but not along its length; Mylar and mica films have been found suitable. On the substrate 90 there are two large areas 92 and 94 of a thin film silver deposit (shown by cross-hatching in FIG. 2); these areas are spaced in opposed relation and are generally kidney-shaped. That is, the outer and inner edges 96 and 98 of each silver area are coaxial circular segments of somewhat less than a semi-circle, which segments are joined by straight and curved edges to form the kidney shape. The outer and inner segments 96 and 98 are positioned to be concentric about a third silver deposit area 100 of circular shape, which is formed at the center of the substrate 90.

In addition to the thin film silver deposits 92, 96, and 100, four other thin metallic film deposits are laid down on the substrate 90 to form two thermocouples 101 and 105 that are radially oriented with respect to the central area 100; the metallic film deposits are very much thinner than substrate 90. These four deposits include a bismuth strip 102 that overlaps the silver area 92 at its inner edge 98 and extends approximately to the midpoint of the annular space between areas 92 and 100. Overlapping the strip 102 at the midpoint region is an antimony strip 104 that extends radially to overlap the central area 100. These two overlapping strips 102 and 104 form a hot thermocouple junction 103 at approximately the midpoint of the annular space and form portions 99 and 109 of an inner and outer cold junction, respectively, where they overlap the silver areas 92 and 100. Similarly, a bismuth strip 106 extends from the central area 100 and overlaps an antimony strip 108 at the midpoint of the annular space, which strip 108 extends radially to overlap the outer area 94. Here again, a hot junction 107 is formed at approximately the midpoint of the annular space, and respectively overlapping portions 111 and 113 of an inner cold junction at the central area 100 and an outer cold junction at outer area 94. Any other suitable thermoelectric materials may be used. The thickness of all of these metallic film deposits is made small relative to the skin depth at the highest operating radio frequency, which ensures proper conversion of the microwave energy into heat by means of the surface radio frequency currents in those deposits.

The resulting thermopile, formed from two thermocouples connected in series aiding relation, has a pair of hot junctions 103 and 107; it has a single central cold junction formed of portions 109 and 111 that are thermally in direct connection via silver area 100 and effectively at the same temperature and that are directly connected electrically; and it has a single outer cold junction formed of portions 99 and 113 in good thermal communcation via heat sinks 52 and 54 and the closely spaced areas 92 and 94, and that are also in electrical communication via the external circuitry. Thus, by maintaining the cold junction portions at the inner area 100 at effectively the same temperature, and similarly for those at the outer areas 92, 94, but a single pair of cold junctions are provided, and the error voltages customarily associated with metallic junctions at different temperatures are avoided.

A circular cover plate 110 (shown in FIG. 4 and omitted from FIGS. 2 and 3), made of electrically insulating material and thin enough to be thermally conductive through its thickness but not along its length, covers the thin film deposits to form a sandwich with the substrate 90 when held in assembled relation between heat sinks 36 and 54. The cover plate 110 has a pair of diametrically opposite holes 112 at the silver regions 92 and 96, through which pass the contacts 66 to make direct electrical contact with those areas. A hole 114 is centrally located and passes through the cover plate 110, and a smaller coaxial hole 115 passes through the central silver area 100, and the substrate 90. This hole 115 passes the metallic screw 58; the hole 114 in the cover plate 110 is enlarged so as not to cover the thermocouples and thereby minimize any thermal conduction therealong, and also to receive the metallic washer 59 which substantially covers the central area 100 (FIGS. 1 and 2); thereby, the washer 59 and screw 58 make direct electrical contact with the central silver area 100 and to the central conductor rod 50, and also ensure a good thermal connection.

A schematic circuit diagram of the measuring system is shown in FIG. 5 in which the equivalent electrical diagram of the thermopile unit 56 is shown in a broken line box, and the electrical elements of FIG. 1 are shown in a larger surrounding broken line box. The microwave energy to be measured in supplied by way of the coaxial transmission line that includes the grounded outer conductor 20' and the central conductor 22' (parts shown schematically and corresponding to those previously described are referenced by similar numerals with the addition of a prime in FIG. 5). The series capacitor 38' in the central conductor connection to the two thermocouples is formed by the barium titanate disc 38 with the conductive faces of the central conductor on either side thereof.

The central conductor 50' is connected to the junction of the equivalent resistances 101' and 105' of the corresponding thermocouples 101 and 105. Two capacitances 92' and 94' are formed by the dielectric of the Mylar substrate 90 in the regions of the silver kidney-shaped deposits 92 and 94, and the capacitance values are determined by the large, almost semi-circular, areas of the silver (each of which determines a plate of one of the capacitors) and the thickness and dielectric constant of the substrate. The other sides of the capacitances 92' and 94' are returned to ground since they are electrically connected via the heat sink 36 to the outer conductor 20'. The contact rods 66 form direct voltage terminals 66' at the opposite ends of the equivalent thermocouple resistances 101' and 105', and these contacts are connected through separate inductors 120 and 122 to output terminals 124 and 126, respectively. These output terminals are connected via shunt capacitors 128 and 130 to ground represented by the terminal 132. The terminals 124, 126, 132 are connected to an amplifier (the chopper stabilized type of direct voltage amplifier has been found suitable) which in turn drives a meter 136. The inductors 120 and 122 and the capacitors 128 and 130 are mounted on the bracket 76 within the enclosure 10 (FIG. 1), and wire leads from the contact rods 66 (at the sleeve 68) are connected to the inductors and capacitors in the manner shown in FIG. 5. Cable 14 carries the three leads to an appropriate coupler forming the terminals 124, 126, 132.

In operation, microwave signals applied to the coaxial transmission line at the input elements 20 and 22 take the form of an electromagnetic field between the central conductor and outer conductor within the measuring unit 18. The thermocouples 101 and 105 provide a matched termination for the transmission line, and the microwave energy is absorbed by these thermocouples with radio frequency currents flowing in the two thermocouples. The RF circuit for these currents is via the central conductor 22', the series capacitor 38', and via the two thermocouples forming two parallel branches to the capacitors 92' and 94' and back to the grounded outer conductor. The energy absorbed by the thermocouples 101 and 104 raises the temperatures of their respective hot junctions 103 and 107 relative to the respective outer and inner cold junctions 99 and 109 and 113 and 111, and this temperature elevation is converted to a direct voltage by the thermoelectric effect. The direct voltage that is generated is additive due to the connection of the thermocouples in series aiding relation, and the direct voltage is supplied to the output terminals 124 and 126 for amplification in amplifier 134 and display by meter 136. The series inductors 120 and 122 and shunt capacitors 128 and 130 isolate the direct voltage circuit from the radio frequency circuit. By suitable calibration of the meter 136, a direct reading of the measured incident microwave energy is afforded.

The geometry of the unit 18 and of the thermopile element 56 is established so that the hot junctions 103 and 107 are preferably located substantially at the radial midpoints of the annular space between the central area 100 and the edges 98 of the areas 92 and 96. In the absence of RF power, the temperatures at the hot junctions 103 and 107 are substantially the same and equal to the average of the temperatures established at the inner conductor 50 and outer heat sink 36. Under these conditions, any temperature differences between the inner and outer conductors produce voltages at the hot junctions 103 and 107 that are substantially equal and opposite in polarity, so that these voltages largely cancel.

However, the location of the hot junctions precisely at the mid-temperature points is necessarily limited by the tolerances of the structures and the care of assembly. Moreover, the geometry of the coaxial transmission line and the measuring unit structures is such that inherently there is a tendency for the temperature of the enclosed central conductor to be higher than the outer conductor, and thereby, correspondingly, the temperatures of the respective cold junctions. This higher temperature is a concomitant of the relative sizes of the available thermal masses at the central and outer conductors, respectively, for absorbing the energy of the RF currents during operation, with the available outer mass being larger than the inner mass, under the circumstance of it being desirable to have the masses as large as possible to ensure stable cold junction temperatures during operation.

This difficulty together with the need for a large central conductor mass is obviated by the use of a thermal shunt, the bead 52, which thermally provides a good conduction path between the central conductor 50 and the large isothermal mass 36 which is readily associated with (and in the preferred embodiment that is illustrated, is made integral with) the outer conductor. Thus, the thermal bead 52 is made of a material that has a good thermal conductivity of the order of aluminum (such as boron nitride or beryllium oxide) to maintain the central and outer conductors at substantially the same temperature and that has properties such that there is substantially no absorption or reflection of the R-F field, and good electrical insulation of the order of Teflon is afforded, so that there is no impairment of the R-F characteristics of the coaxial transmission line structure. With the inner and outer conductors maintained at substantially the same temperature, the reference cold junction temperatures are stable, and there is essentially no drift due to differential voltages being generated in standby condition or during operation.

Thus, the criticality of the location of the hot junctions at the mean temperature point is avoided. This location of the hot junctions is difficult to attain not only because of imperfections and tolerances in construction, but also because the temperature gradient is not a linear one; therefore, the criterion of a linear gradient, which is the basis for establishing the hot junctions at the midpoint position, is at best an approximate one. However, the thermal shunt 52 ensures that the cold junction temperatures are all maintained at substantially the same temperature so that the location of the hot junction at the midpoint position is effectively at the mean temperature point for any small temperature differential that may occur.

The thermal shunt 52 by reason of the proper choice of dielectric material does not interfere with the R-F absorption at all, nor is there any substantial reflection of the R-F field produced by that element being connected between the inner and outer conductors. There is a very low electrical conductivity to avoid any electrical short-circuiting or interference with the impedance matching of the thermocouple elements.

The microwave energy that is being measured produces as low as 0.001 degree centigrade, or lower, change in the hot junction temperature. However, the gross changes of ambient temperature during ordinary operation would be as much as one degree and could be as much as twenty degrees centigrade over various operating conditions. By means of the thermal isolation of the measuring unit 18 as well as the isothermal maintenance of the inner and outer conductors, accurate temperature measurements by the thermopile are assured over this range of conditions.

In view of the small thermal voltages that are generated and measured, the signal-to-noise ratio is substantially affected by the Johnson (thermal agitation) noise that is present. The Johnson noise of each thermocouple is cumulative and increases with the number of the thermocouples that are employed. For optimum design, it has been found desirable to use a pair of thermocouples to achieve drift voltage cancellation as described above, but to limit the number of thermocouple pairs to the single pair described, and thereby achieve an optimum signal-to-noise ratio. The use of but a single pair of thermocouples makes possible a simple construction of the thermopile at the central conductor; that is, a single central cold junction is formed at portions 109 and 111 of both thermocouples, which portions are placed in direct thermal and electrical connection through the silver area 100 that corresponds in size to that of the face of central conductor 50 (if more than one thermocouple pair were utilized, there would be several central cold junctions, and they would not be in direct electrical and thermal contact); and the single central cold junction can therefore be directly connected electrically and thermally to the central conductor 50 by way of the screw and washer 58 and 59. This construction also makes possible the formation of a large series R-F capacitance by means of the dielectric disc 38, without being required to develop larger capacitance areas or thicker dielectric films at the interface of the central conductor 50 and thermopile element 56 to attain the substantial capacitance that is required. That is, the bottom limit of the microwave frequency that can be measured is primarily determined by the size of the series capacitance 38' (FIG. 5), and this series capacitance can be readily fabricated by means of the dielectric disc 38, rather than by using special thicknesses of film or larger capacitor areas at the interface of the central conductor 50 and the thermopile element 56. The values of the capacitances 92' and 94 (FIG. 5) are determined by the size of the silver areas 92 and 94 and the thickness and dielectric constant of the substrate 90. Therefore, the use of a single pair of thermocouples makes it possible to use the available area effieciently for large silver deposits 92 and 94 (which utilize most of the available area at the face of heat sink 32) to obtain large capacitances 92' and 94' and to dissipate the thermal energy developed during operation to the heat sinks 36 and 54.

The contacts 66, which tap off the direct thermal voltage for the meter circuit, are positioned to engage the silver deposits 92, 94 at a point somewhat removed from the cold junction portions themselves. Consequently, there is a small voltage drop due to the passage of the direct current through the silver deposits 92 and 94 from the cold junction to the points of contacts 66. This small voltage drop is readily calculated and taken into consideration in calibrating the meter for the actual voltages developed by the thermocouple elements themselves. However, by so locating the contacts 66 away from the portions 99 and 113 of the outer cold junction, R-F leakage through those contacts is minimized. The generated thermal voltage has a polarity that depends upon the relative orientation of the thermoelectric materials. By using an asymmetrical arrangement of metallic index pins 72 and 74, the element 56 is always positioned in a unique relationship to establish a positive voltage at one of the contacts 66 and a negative voltage at the other contact 66. Holes 116 are provided in the substrate 90 and cover plate 110 for the pin 72, and notches 118 for the pin 74. An additional similar dielectric cover plate may be provided, if desired, between the substrate 90 and the face of heat sink 36.

The diameter of the area 100 is slightly larger than the diameter of the end face of the central conductor 50, which is shown in broken lines in FIG. 3; similarly, the diameter of the circle formed by the inner edges 98 is slightly less than the diameter of the central opening 60 in the heat sink 36, which is also shown in broken lines in FIG. 3. These dimensions of the silver areas 92, 94, and 100 and the location of the inner and outer cold junctions at the edges of those areas effectively place both of those cold junctions within the space between the inner and outer coaxial conductors and thereby within the electromagnetic field. Though there may be some tendency for the cold junction portions to absorb energy and to be heated in those locations, the large silver deposits 92, 94, and 100 in close contact therewith are effective to conduct such heat away rapidly and maintain the cold junctions at the temperature of the isothermal mass 36. Thus, any temperature rise in the cold junctions is relatively slight without substantial impairment of the operation of the measuring circuit.

This choice of dimensions, it has been found, solves a serious problem that arises in calibration of the instrument. That is, it is most important that the cold junction at either the central or outer conductor not be positioned with the edge of the outer conductor 36 so overlapping either portion 99 or 113 of the outer cold junction that the cold junction edge is spaced outwardly from the inner edge of the outer conductor (and correspondingly inwardly for either portion 109 or 111 of the cold junction at the inner conductor 50). Where such overlapping occurs, a shorting of the R-F circuit takes place since a small capacitive area exists between the overlapping outer conductor (or inner conductor) and the portion of the thermoelectric strip that is so overlapped. With the shorting out of the R-F current, a portion of the thermoelectric element is not heated up so that a portion of the R-F current is effectively not contributing to the D-C microvoltage that is being measured. For purposes of calibrating the meter, available power standards require the use of an audio frequency signal (whose current and voltage can be measured) as the standard power source. However, during calibration with the audio frequency, there is only a negligible amount of shunting of the audio current where the aforementioned overlap condition exists. Consequently, the operating conditions for R-F currents are substantially different from those used during the meter calibration where R-F current shorting takes place. Since the elements operate differently under the R-F and the audio conditions, the sensitivity derived for the R-F measurement is not the same as that for the calibrating measurement. This same shorting effect and mis-measurement takes place for either portion 99 or 113 of the cold junction at the outer conductor and either portion 109 or 111 of the cold junction at the central conductor resulting from misalignment of the thermoelectric element 56 and the heat sinks 36 and 54. Due to the tolerances of construction, various types of misalignment of these three elements may occur; namely, misalignment of the cavity 62 with the inner surface 60 of the outer conductor 36, misalignment of the thermopile element with respect to the outer conductor surface 60, or a combination of both. By the aforementioned relative dimensions chosen for the silver deposits 92, 94, and 100, there is full compensation for any such misalignment, and the cold junctions are always properly located to avoid shorting of the R-F currents. Thus, the operating conditions for both the R-F and the calibrating audio currents are effectively the same, and the power being measured is similarly the same under both calibrating and operating conditions.

With respect to the portions 99 and 113 of the outer cold junction, they overlap the silver areas 92 and 94 in the region between their inner edges 98 and the corresponding edge 60 of the outer conductor 36, as shown in FIG. 3. Under these circumstances, the portions 99 and 113 of the outer cold junction are always located at the inner edges 98 of the outer silver areas and at the same distance from the hot junction for each thermocouple under the various conditions of misalignment that may occur. Similarly, the portions 109 and 111 of the inner cold junctions are always located at the outer edges of the central silver area 100. Therefore, there is considerable tolerance available in the amount of overlap of the antimony and bismuth strips with the outer silver areas, and this overlap may be made larger than that shown in the drawing to any convenient size that may be desirable for structural or fabrication purposes; the broken line extensions at the portions 99 and 113 of the outer cold junction indicate suitable extensions of the respective bismuth and antimony strips 102 and 108. Similarly, at the inner conductor, instead of the relatively small areas of overlap of the antimony and bismuth strips with the silver deposit 100, any larger area of overlap may be provided as desired since effectively, only a single cold junction is established, and this may include the entire area of the silver strip being covered by both the antimony and bismuth deposits at the central conductor without significant effect on the operation of the system.

This feature of the invention may be used with a hollow conductor waveguide as well as with the coaxial transmission line described above. The hollow conductor is formed in two aligned sections, with one section having a pair of opposing ridges internally, in a preferred form of the invention, in order to ensure good thermal balance on opposite sides of the waveguide, and the other section forming a mating high impedance cavity. The waveguide is made of good thermally conductive material to maintain the opposing ridges in good thermal communication. A pair of parallel thermocouples are formed as a unit in the manner described on a substrate with overlapping thin film strips extending between two large spaced silver areas, at one ridge and a single such area at the other. The unit is connected across the faces of the two ridges and between the two waveguide sections and electrically insulated from the sections. The silver areas at the two ridges are dimensioned to extend slightly into the space between the ridges; that is, the distance between the two ridges is greater than the distance between the edge of the silver area at one ridge and the edges of the two silver areas at the other ridge, at which edges the cold junction portions are formed. Thereby, the hot junctions are approximately midway in the space between the ridges and the cold junctions located effectively at the edges of the opposing ridges but extending within the space for the electromagnetic field in a manner similar to that described above with respect to FIG. 3. Thereby, any misalignments of the thermopile or of the two sections of the waveguide do not result in any shorting of the R-F currents.

A modified form of the invention is shown in FIG. 6 which is a fragmentary view similar to FIG. 1, and the reference numerals thereof are the same for corresponding parts, and modified parts employ the same reference numerals with the addition of a double prime corresponding to the parts in FIG. 1. In place of the thermal shunt connection 52 in FIG. 1, a thermal shunt 52″ is provided (in the modification of FIG. 6) in the cutoff cavity 62″ within the heat sink 54″. The thermal shunt 52″ may be a bead of boron nitride (or beryllium oxide) which is fastened in position to have good thermal connection between the wall of the cavity 62″ and the central portion 100 of the thermopile element 56. In other respects, the construction and operation of the modification of FIG. 6 is the same as that described above. The boron bead 52″ is positioned in good thermal contact between the heat sink 54 and the central conductive region 100 of the thermopile element to maintain that central portion at the same temperature as the heat sink 54 and thereby the heat sink 36 as well; the heat sinks are thermally and electrically in close communication via metallic screws 70 and pins 72, 74, and the thermopile unit 56 is so thin that heat transfer takes place through it. Thereby, the end of the central conductor 50 is also maintained at that temperature since all of these elements are thermally in connection with each other. The thermal connection is completed via the washer 59 and screw 58 which are used to mount the thermopile element on the end of conductor 50 and via the central silver area 100. The cutoff cavity 62′ is designed to have dimensions consistent with the different dielectric therewithin.

The thickness of the metallic film deposits forming the thermoelectric strips 102, 104 and 106, 108 are determined by the desired resistances for matching the coaxial line impedance. The resistances of the two strips forming a thermocouple are chosen to be approximately equal, and the total resistance for each of the thermocouples (which are in parallel to the R-F is the same and twice the line impedance. This ensures proper matching and is consistent with the desired balance of thermal conductivity and heat dissipation.

Accordingly, this invention furnishes an improved thermopile device for measuring microwave power. The device is substantially free of ambient temperature effects, is highly stable and has minimal drift. It has a high signalto-noise ratio, is effective for broad band operation, and can be reliably calibrated by audio signals.

This invention is not restricted to the use of any particular materials for its various parts nor to any particular geometrical or dimensional characteristics, except as indicated, since various modifications and ranges thereof are within the spirit of this invention. For example, the thermocouples need not be formed along the same diameter of the coaxial line structure, as shown, since the hot junctions may be located along any desired radii.

What is claimed is:

1. A microwave power measuring apparatus comprising a coaxial transmission line having spaced coaxial electrically and thermally conductive surfaces, a thermocouple load unit connected between said surfaces and having a hot junction device in the space between said surfaces and spaced cold junction portions electrically and thermally coupled to said surfaces, and means for maintaining said cold junction portions at substantially the same temperature including electrically non-conductive means adjacent to said load unit for providing an effective thermally conductive connection between said surfaces, whereby substantially the same temperature difference is developed between said hot junction and each of said cold junction portions during the application of microwave power to said apparatus.

2. A microwave power measuring apparatus as set forth in claim 1 wherein said thermocouple unit includes a pair of thermocouples each extending between said coaxial surfaces, with the hot junctions of each of said thermocouples located approximately midway between said surfaces.

3. A microwave power measuring apparatus as set forth in claim 2 wherein said temperature maintaining means includes a large metallic member forming the outer one of said coaxial surfaces, and said electrically non-conductive and thermally conductive means includes an element of electrically insulating material connected between said coaxial surfaces.

4. A microwave power measuring device as set forth in claim 3 wherein said electrically insulating element includes a cylindrical bead surrounding the inner one of said coaxial surfaces and in good thermal contact with both of said surfaces.

5. A microwave power measuring device as set forth in claim 3 wherein said electrically insulating element includes a bead connected between the end of said inner conductor and said metallic member.

6. A microwave power measuring device as set forth in claim 5 wherein said metallic member includes two mating sections and means for mounting said thermocouple unit between adjacent faces thereof; said inner conductor extending coaxially through a central opening of one of said sections and terminating in the plane of said face thereof, said other section having a cutoff cavity at the center thereof and opposite the central opening of said one section, said bead extending into said cutoff cavity.

7. A microwave power measuring apparatus comprising a coaxial transmission line having spaced coaxial metallic conductors; a thermopile unit connected between said conductors including a single pair of thermocouples each separately having a hot junction in the space between said conductors, and each having a cold junction portion capacitively coupled to the outer one of said spaced conductors, and a cold junction portion directly connected electrically and thermally to the inner one of said spaced conductors; said inner conductor including a plurality of spaced, aligned conductive elements and a layer of dielectric material connected between adjacent surfaces thereof to form a capacitive element in said inner conductor, one of said conductive elements being directly connected electrically and thermally to said inner cold junction portions; means for maintaining said inner cold junction portions at substantially the same temperature as said outer cold junction portions including electrically non-conductive means for providing an effective thermally conductive connection between said conductors, whereby substantially the same temperature difference is developed between said hot junction of each thermocouple and each of the associated inner and outer cold junction portions, said electrically non-conductive and thermally conductive means being connected between said one conductive element and said outer conductor; and means for deriving voltages developed at said outer cold junction portions.

8. A microwave power measuring apparatus as recited in claim 7 wherein said conductors are of circular shape and have end faces in a common plane; said thermopile unit includes a thin electrically insulating substrate, a central circular area of metallic deposit on said substrate, two large arcuate areas of metallic deposit on said substrate spaced from each other and spaced coaxially from said central area by a distance less than the spacing between said conductors, each of said thermocouples being formed of two deposits of dissimilar resistive metals on said substrate, said thermocouple deposits extending radially between said central and arcuate areas and overlapping each other to form said hot junctions and overlapping the edges of said central and arcuate areas to form said cold junction portions, and means for fastening said thermopile unit to the end face of said central conductor with said cold junction portions located in the space between said conductors and for making a direct electrical and thermal connection between said central area and said one of the conductive elements of said inner conductor, said arcuate areas and said end face of the outer conductor with the substrate therebetween forming separate capacitances.

9. A microwave power measuring apparatus comprising a coaxial waveguide transmission line having spaced coaxial conductors of circular shape with end faces in a common plane; a thermopile load unit comprising a thin electrically insulating substrate, a central circular area of metallic deposit on said substrate larger than the area of said face of the inner conductor of said transmission line, two large spaced arcuate areas of metallic deposit on said substrate spaced from each other and spaced coaxially from said central area by a distance less than the distance between said coaxial conductors, and a single pair of thermocouples each formed of two deposits of dissimilar resistive metals on said substrate, said deposits of each thermocouple extending radially between said central area and a different one of said arcuate areas and overlapping each other in the space therebetween to form a hot junction, two of said dissimilar metal deposits overlapping said central area to form cold junction portions at the outer edges thereof and two others of said dissimilar metal deposits respectively overlapping said arcuate areas to form cold junction portions at the inner edges thereof; and means for fastening said thermopile unit to the faces of said conductors and for positioning said cold junction portions in the space between said conductors; whereby both microwave and low frequency currents applied to said load unit flow to the same extent through said resistive deposits and the temperature differences between said hot junction and cold junction portions are representative of the power of said currents absorbed by said resistive deposits.

10. A microwave power measuring apparatus as recited in claim 9 wherein said fastening means includes a metallic fastener in good thermal and electrical contact with said inner conductor and with substantially the entire central deposit area.

11. In a microwave power measuring apparatus comprising:

a coaxial transmission line including spaced coaxial electrical and thermal conductors having associated coaxial surfaces with one surrounding the other, the outer and inner ones of said conductors respectively having a large insothermal mass and a small mass;

a thermocouple load unit having a hot junction and spaced cold junction portions;

and means for mounting said load unit between said surfaces with said hot junction in the space between said surfaces and each of said cold junction portions electrically and thermally connected to a different one of said surfaces;

the improvement of:

means for maintaining the inner one of said cold junction portions at substantially the same temperature as the outer one thereof including electrically non-conductive and thermally conductive means connected between said inner and outer conductors adjacent to said load unit;

whereby substantially the same temperature difference is developed between said hot junction and each of said cold junction portions during the application of microwave power to said apparatus.

12. A microwave power apparatus as recited in claim 11 wherein said thermally conductive means includes an annular bead of electrically non-conductive and thermally conductive material surrounding said surface of the inner conductor and in good thermal contact therewith and with the surrounding surface of said outer conductor, said bead being substantially nonabsorbent and non-reflective to microwave fields.

13. A microwave power apparatus as recited in claim 12 wherein said bead is fabricated of boron nitride.

14. In a microwave power measuring apparatus comprising:

a microwave transmission line having a plurality of electrically conductive elements arranged as a waveguide with spaced waveguide surfaces and with generally coplanar faces transverse to said waveguide surfaces;

a thermoelectric load unit connected between said faces including:

a thin electrically insulating substrate, a plurality of spaced areas of metallic thin films of negligible resistance on said substrate, at least one pair of dissimilar metallic thin films of substantial resistance on said substrate overlapping each other to form a hot junction in the space between said waveguide surfaces and respectively overlapping first and second ones of said negligible-resistance areas to form cold junction portions;

means for mounting said thermoelectric unit as a termination of said line and with said first and second film areas respectively adjacent said faces;

and means for sensing voltages developed by said dissimilar films in response to temperature differences between said hot junction and said cold junction portions;

the improvement of:

adjacent edges of said first and second film areas being spaced from each other by a distance less than the distance between said spaced waveguide surfaces;

and said mounting means including means for positioning said first and second film areas with the adjacent edges thereof overlapped by said resistive films and extending into the space between said waveguide surfaces so that the cold junction portions are located in a microwave field between said waveguide surfaces;

whereby low frequency currents applied to said first and second areas and microwave currents flow through the entire length of said resistive films between said adjacent edges of the first and second film areas to produce temperature differences between said hot junction and cold junction portions and corresponding sensed voltages representative of the power of said currents absorbed by said resistive films, and the power of said low frequency currents may be used to calibrate measurements of microwave power applied to the apparatus.

15. A microwave power measuring apparatus as recited in claim 14 wherein said hot junction is located approximately midway between said areas.

16. A microwave power measuring apparatus as recited in claim 14 wherein said transmission line is a coaxial line, and said spaced conductive elements are the inner and outer conductors thereof.

17. A microwave power measuring apparatus as recited in claim 14, wherein:

said load unit further includes a third of said negligible-resistance film areas;

and a second pair of said dissimilar metallic films overlapping each other to form a second hot junction and respectively overlapping said second and third film areas to form cold junction portions;

said mounting means includes means for mounting said first and third film areas adjacent the same element face;

adjacent edges of said first and third film areas being spaced from each other by a distance less than the distance between said spaced waveguide surfaces;

and said mounting means further includes means for positioning said first and third film areas with the adjacent edges thereof overlapped by said second resistive films and extending into the space between said waveguide surfaces;

whereby microwave current flows through the entire length of said resistive films between adjacent edges of said first and third film areas.

18. A microwave power measuring apparatus as recited in claim 17, wherein:

said voltage sensing means includes separate electrical means for contacting said first and third film areas.

19. A microwave power measuring apparatus as recited in claim 18, wherein said waveguide elements are coaxial conductors and said first and third film areas are associated with the outer one of said conductors and said second film area with the inner one thereof.

20. A microwave power measuring apparatus as recited in claim 7, wherein said one conductive element includes a first solid rod connected electrically and thermally to said central metallic deposit and thermally to said thermally conductive means, a second solid rod connected to said dielectric layer, and a hollow tube connecting said first and second rods.

References Cited

UNITED STATES PATENTS

| | | | |
|---|---|---|---|
| 2,131,101 | 9/1938 | Ferris | 333—81 |
| 3,098,984 | 7/1963 | Martin | 324—106 XR |
| 3,124,747 | 3/1964 | Hermach | 324—106 XR |
| 3,128,428 | 4/1964 | Lush | 324—106 XR |
| 3,147,436 | 9/1964 | Hopfer | 324—106 XR |
| 3,237,101 | 2/1966 | Vaughan | 324—106 XR |

OTHER REFERENCES

Strauss, Irving: "Broadband R.F. Power Meters," Radio-Electronic Engineering, December 1954; pp. 10, 11, and 36.

RUDOLPH V. ROLINEC, *Primary Examiner.*

E. F. KARLSEN, *Assistant Examiner.*